United States Patent
Irish et al.

(10) Patent No.: US 7,411,956 B2
(45) Date of Patent: Aug. 12, 2008

(54) METHODS AND APPARATUS FOR ROUTING PACKETS

(75) Inventors: John David Irish, Rochester, MN (US); Ibrahim Abdel-Rahman Ouda, Rochester, MN (US); James A. Steenburgh, Rochester, MN (US); Jason Andrew Thompson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 10/454,932

(22) Filed: Jun. 5, 2003

(65) Prior Publication Data

US 2004/0246960 A1 Dec. 9, 2004

(51) Int. Cl.
*H04L 12/28* (2006.01)

(52) U.S. Cl. .................. 370/392; 370/412; 717/166

(58) Field of Classification Search ............... 370/392, 370/412, 401; 717/165, 166
See application file for complete search history.

(56) References Cited

U.S. PATENT DOCUMENTS 5,633,865 A * 5/1997 Short ..................... 370/412
7,159,213 B2 * 1/2007 Tock ..................... 717/166

OTHER PUBLICATIONS

Jan van Lunteren, "Searching Very Large Routing Tables in Fast SRAM", Proceedings of the 10th IEEE International Conference on Computer Communications and Networks ICCCN '01, IBM Research Laboratory, Oct. 2001, Zurich, pp. 4-11.

* cited by examiner

*Primary Examiner*—Seema S. Rao
*Assistant Examiner*—Sai-Ming Chan
(74) *Attorney, Agent, or Firm*—Dugan & Dugan

(57) ABSTRACT

In a first aspect, a first method is provided that includes the steps of (1) providing a pointer that includes a first keytype field and a second keytype field; and (2) assigning a value to the second keytype field of the pointer based on a tabletype field of an updated table. The updated table is an updated version of a first table written in a memory, and the first keytype field of the pointer has a value assigned based on a tabletype field of the first table. The first method further includes the step of employing the second keytype field of the pointer to point to the updated table. Numerous other aspects are provided.

27 Claims, 3 Drawing Sheets

METHODS AND APPARATUS FOR ROUTING PACKETS

FIELD OF THE INVENTION

The present invention relates generally to network processor technology, and more particularly to methods and apparatus for routing data packets.

BACKGROUND OF THE INVENTION

Data and storage communication networks are in widespread use. In many network devices used in data and storage communication networks, such as switches and routers, data routing tables are employed to route data packets or frames from point to point between a source and a destination via one or more networks.

Network processors often are employed to handle transmission of data into and out of network devices. Such network processors may store one or more routing tables, and employ keys and/or "signatures" to point to and/or access information within the routing tables.

A problem may arise within a network processor when an updated version of a routing table is created. Specifically, the network processor should ensure that all keys that are used to access a particular table access the most up-to-date version of the table.

Some network processors use a unique signature value to uniquely identify each routing table and/or table entry. In order to allow access to a table or table entry, a key must include a signature that matches the signature of the table or table entry. To ensure that each key generated by a network processor accesses the most up-to-date version of a table, software within the network processor may be employed to control the creation of keys and to track the current signature value that is to be associated with each key. However, despite such an approach, ensuring that each key generated by a network processor accesses the most up-to-date version of a table remains difficult.

SUMMARY OF THE INVENTION

In a first aspect of the invention, a first method is provided that includes the steps of (1) providing a pointer that includes a first keytype field and a second keytype field; and (2) assigning a value to the second keytype field of the pointer based on a tabletype field of an updated table. The updated table is an updated version of a first table written in a memory, and the first keytype field of the pointer has a value assigned based on a tabletype field of the first table. The first method further includes the step of employing the second keytype field of the pointer to point to the updated table.

In a second aspect of the invention, a second method is provided that includes the steps of (1) writing a table in a memory; (2) assigning a unique tabletype field to the table; (3) providing a pointer that includes a first keytype field and a second keytype field; and (4) assigning a value to the first keytype field based on the tabletype field of the table. The second method further includes the steps of (1) writing an updated version of the table in the memory; (2) assigning a unique tabletype field to the updated version of the table; (3) assigning a value to the second keytype field of the pointer based on the tabletype field of the updated version of the table; and (4) employing the second keytype field of the pointer to point to the updated table.

In a third aspect of the invention, a third method is provided that includes the steps of providing a plurality of pointers, each pointer including a first keytype field a second keytype field. For each pointer, a value of the second keytype field is set to be equal to a value of the first keytype field. The third method further includes the steps of (1) directing each pointer to employ the first keytype field of the pointer during pointing; (2) writing an updated version of a table in a memory; (3) assigning a unique tabletype field to the updated version of the table; (4) assigning a value to the second keytype field of one or more of the pointers based on the tabletype field of the updated version of the table; and (5) directing each pointer to employ the second keytype field of the pointer during pointing.

Numerous other aspects are provided, as are apparatus and computer program products in accordance with these and other aspects of the invention. Each computer program product described herein may be carried by a medium readable by a computer (e.g., a carrier wave signal, a floppy disc, a compact disc, a DVD, a hard drive, a random access memory, etc.).

Other features and aspects of the present invention will become more fully apparent from the following detailed description, the appended claims and the accompanying drawings.

DETAILED DESCRIPTION

A network processor typically performs such functions as packet classification, packet modification, queue management and/or packet forwarding. For example, packet classification may include identifying a packet based on known characteristics (e.g., address or protocol). Packet modification may include modifying a packet to comply with a protocol (e.g., updating the header information of a TCP/IP protocol packet). Queue management may include queuing, de-queuing and scheduling of packets to be used by an application. Packet forwarding may include forwarding or routing a packet, such as a TCP/IP protocol packet, to the packet's appropriate destination address.

Packet routing tables maintained by a network processor include information about routes available to packets that are received and/or are to be transmitted by the network processor, and/or the condition of those routes. Existing routing tables may be updated or new routing tables may be created to include routes that are newly available to the network processor or to remove routes that are no longer available to the network processor.

When a network processor contains multiple routing tables, the network processor may need to switch from using one routing table to another routing table to route packets correctly. The network processor may need to switch from an older version of a routing table to an updated routing table, for example. In such instances, the value of the signature (herein referred to as a "keytype field") for each key that is to be used to access the updated routing table must be modified so as to point to the updated table. Because a plurality of keys may be used to access the updated table, the plurality of keys should be modified at nearly the same instant in time. In this manner, a clean boundary may exist between the time that packets were routed by accessing an old routing table and the time that packets were routed by accessing an updated table. Methods and apparatus for performing such global or "atomic" key updates are described below with reference to FIGS. 1-3.

Figure 1:
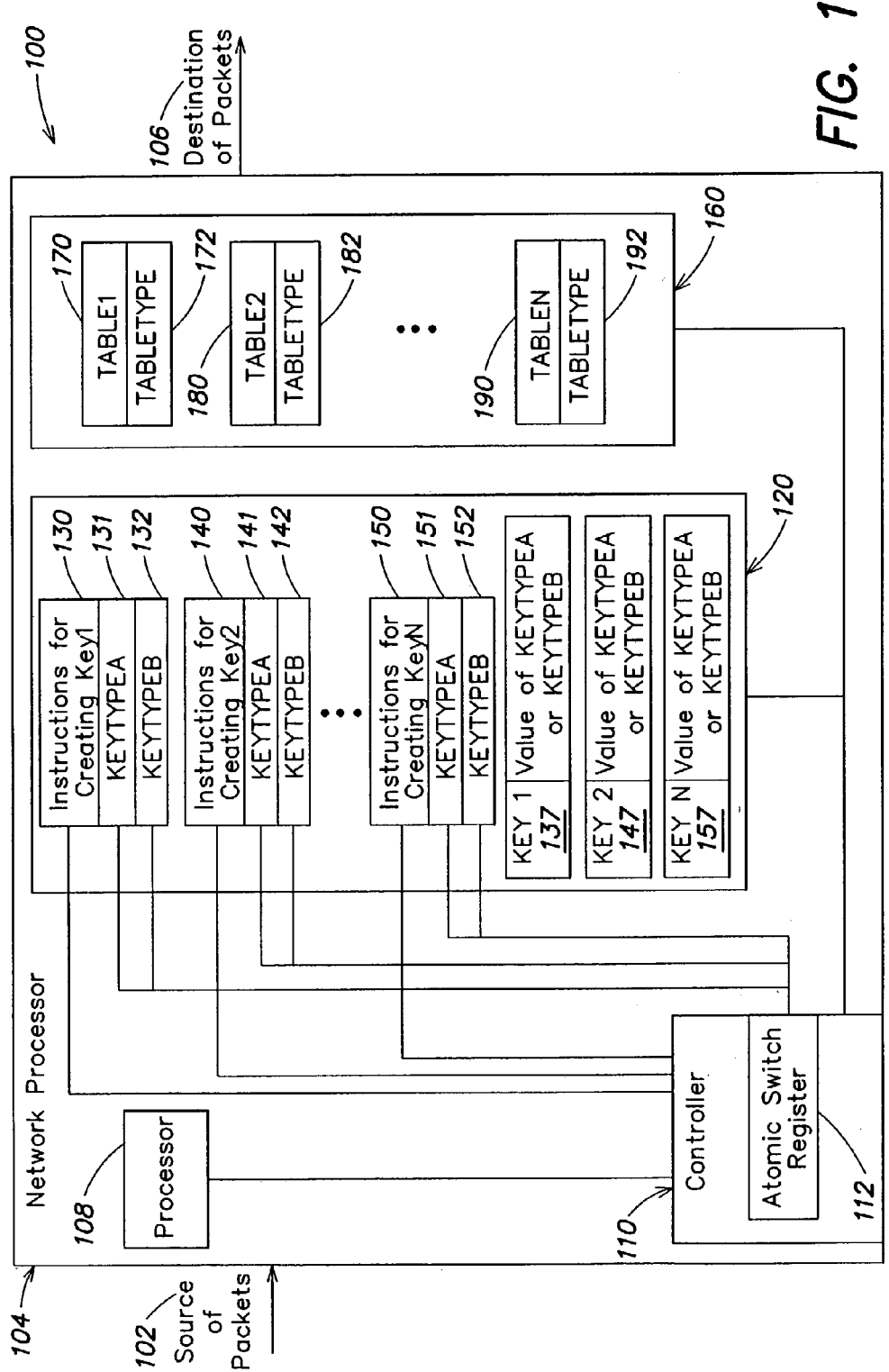
FIG. 1 is a block diagram of a system for routing data packets according to an embodiment of the present invention.

FIG. 1 is a diagram of an exemplary network processor system 100 in which the present methods and apparatus may be implemented. The network processor system 100 includes a source 102 of packets (e.g., data packets) coupled to an input of a network processor 104. An output of the network processor 104 is coupled to a destination 106 of packets.

The network processor 104 may include one or more memories (described below), such as SRAM, for operating on memory data structures. The network processor 104 executes instructions and operates with the memory data structures to route packets received by the network processor 104 to specified destinations as described further below. The network processor 104 may include or be a part of, for example, a network switch or a network router.

The source of packets 102 and the destination of packets 106 may include, for example, network devices connected over a network communications path (e.g., operating at a high data packet transfer rate). Suitable data packet protocols may include TCP/IP, ATM or the like.

In the embodiment of FIG. 1, the network processor 104 includes a processor 108. The processor 108 is coupled to a controller 110, which is in turn coupled to first and second memories 120, 160 (e.g., SRAMs or other suitable memories). The controller 110 includes pointers to one or more sets 130, 140, 150 of instructions for creating a key, which may be stored in the first memory 120. While three sets of instructions for creating a key are shown in FIG. 1, it will be understood that fewer or more than three sets of instructions may be employed. In at least one embodiment, the network processor 104 may include sixteen sets of instructions for creating a key.

Each set of instructions for creating a key includes a value for a KEYTYPEA field 131, 141, 151 and a value for a KEYTYPEB field 132, 142, 152. Exemplary structures of a key that may be created by executing a set of instructions will be described below with reference to FIGS. 2A-2B.

With reference to FIG. 1, the controller 110 includes an atomic switch register 112 that stores one or more bits. The atomic switch register 112 is coupled to each set 130, 140, 150 of instructions for creating a key, and as will be described below, may be employed to globally select either the value of the KEYTYPEA or KEYTYPEB field that will be included as a part of each key that is created using each set 130, 140, 150 of instructions. Other locations for the atomic switch register 112 may be employed (e.g., within the processor 108, within a dedicated hardware circuit, etc.).

The first memory 120 may store any keys 137, 147, 157 that were created from the sets 130, 140, 150 of instructions for creating a key. Such keys may also be referred to as "access keys", as they may point to or otherwise provide access to one or more routing tables.

The second memory 160 stores one or more tables 170, 180, 190, such as routing or Address Resolution Protocol (ARP) tables. A routing table may include for example, one or more entries that relate to available routes and/or route conditions and that may be used to determine the best route for a packet that is to be transmitted by the network processor 104. An ARP table may include, for example, information that allows translation between a network layer-level address (e.g., a TCP/IP address) and a link layer-level address (e.g., a Media Access Control (MAC) address). While three tables 170, 180, 190 are shown in FIG. 1, it will be understood that fewer or more tables may be employed. Each table 170, 180, 190 includes a unique tabletype field 172, 182, 192, respectively. In at least one embodiment of the invention, one or more of the routing tables 170, 180, 190 may be TCP/IP protocol routing tables that contain network layer-level routing information. As stated while three sets 130, 140, 150 of instructions, three keys 137, 147, 157 and three tables 170, 180, 190 are shown in FIG. 1, it will be understood that other numbers of sets of instructions, keys and/or tables may be employed.

Figure 2A:
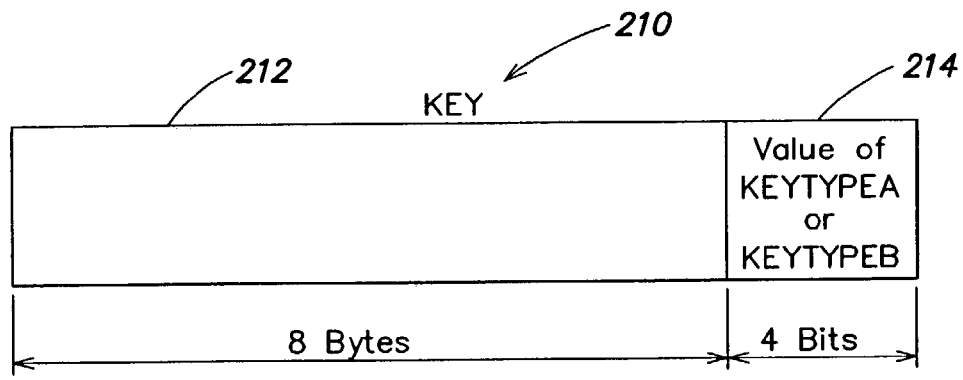
FIG. 2A is a block diagram of a first exemplary key that may be used to access a routing table in accordance with the present invention.
Figure 2B:
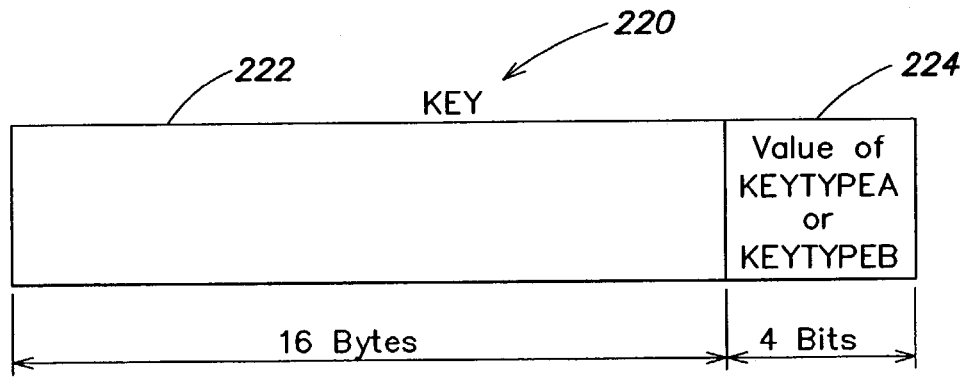
FIG. 2B is a block diagram of a second exemplary key that may be used to access a routing table in accordance with the present invention.

FIGS. 2A-B are block diagrams of exemplary access keys that may be used to access information stored as entries in a table in accordance with the present invention. As mentioned above, each set 130, 140, 150 of instructions for creating a key may create an access key (e.g. within the first memory 120). As shown in FIG. 2A, a first exemplary access key 210 may include eight bytes of information 212, such as header information of a packet (e.g., the destination IP address from the header of a newly received TCP/IP v.4 protocol data packet), and four bits of type information stored in a keytype field 214. Alternatively, as shown in FIG. 2B, a second exemplary key 220 may include sixteen bytes of information 222, such as header information of a packet (e.g., the destination IP address in the header of a newly received TCP/IP v.6 protocol data packet), and four bits of type information stored in a keytype field 224. Other data sizes may be employed for the information and/or keytype fields. For example, 6 bytes of information may be utilized if the key is employed for an Ethernet MAC address look up.

Figure 3:
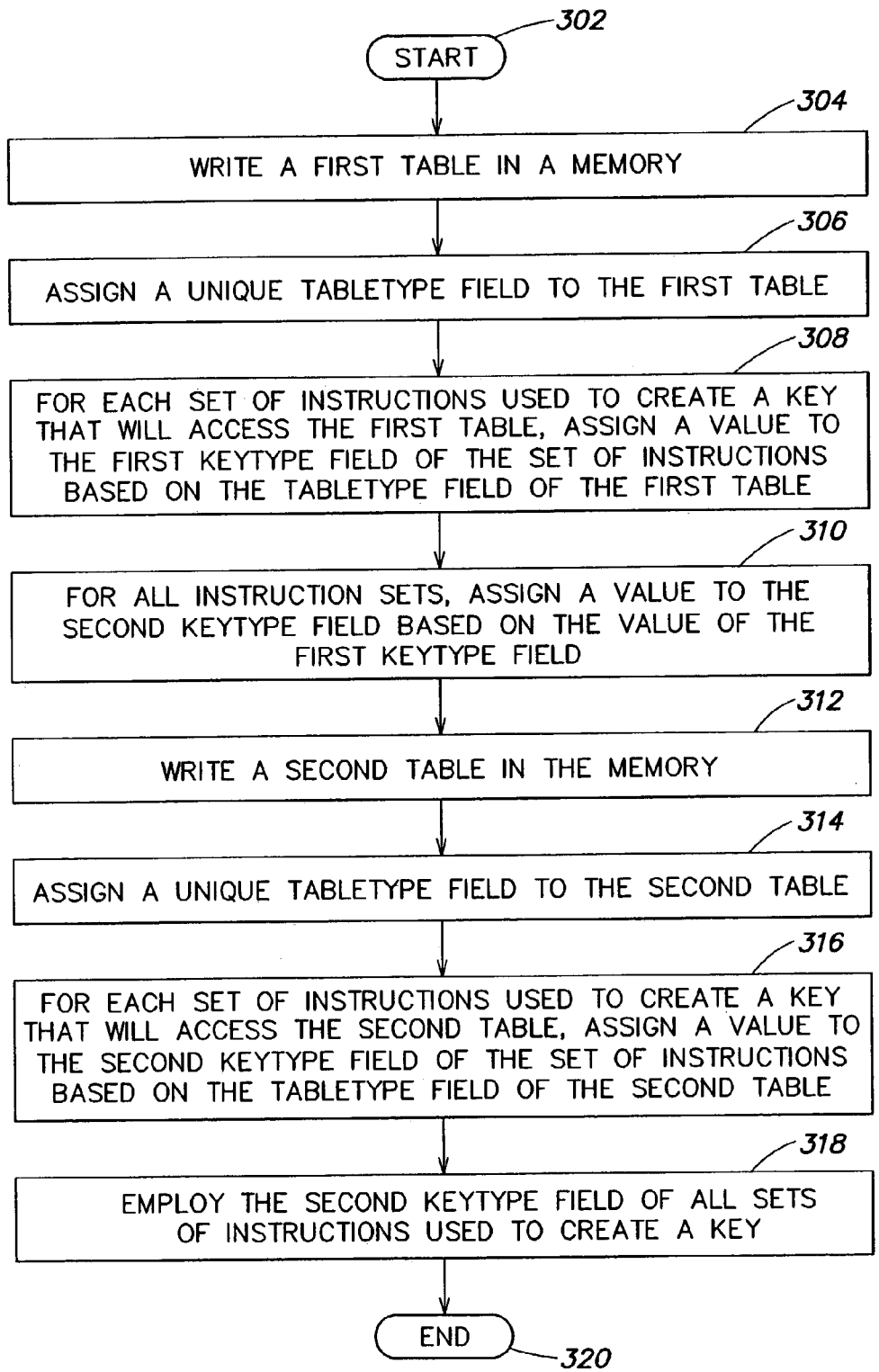
FIG. 3 illustrates an exemplary process for switching to a new version of a routing table in accordance with the present invention.

The operation of the network processor system 100 is now described with reference to FIGS. 1-2B, and with reference to FIG. 3 which illustrates an exemplary method of routing data packets. With reference to FIG. 3, in step 302, the method of routing data packets begins. In step 304, a new table is written into a memory. For example, the table 170 may be written into the second memory 160 by the processor 108 and/or the controller 110. As stated, the table 170 may include, for example, information about available routes and their conditions, information that allows translation between a network layer-level address and a link layer-level address, etc. Following the writing of a new table into the second memory 160, in step 306, the network processor 104 (e.g. via control software that is included in the network processor 104 of the network processing system 100), assigns a unique value to the tabletype field of the table (e.g., tabletype field 172 of the table 170). In at least one embodiment, the size of the tabletype field 172 is equal to the size of the KEYTYPEA and KEYTYPEB fields of the sets 130, 140, 150 of instructions for creating an access key. For example, the size of the tabletype field may be 4 bits (or any other suitable size).

In step 308, based on the tabletype field of the newly written table, the network processor 104 assigns a value to the first keytype field (e.g., KEYTYPEA field) of each set 130, 140, 150 of instructions for creating a key that will generate a key that accesses the newly written table. As an example, assume that the first and second sets 130, 140 of instructions for creating a key will generate keys that access the newly written table (table 170 or TABLE1 in FIG. 1). Following writing of the table into the second memory 160, software of the network processor 104 may assign a value to the KEYTYPEA field of each set 130, 140 of instructions for creating a key based on the value of the tabletype field 172 of the table 170.

In step 310, the network processor 104 assigns a value to the second keytype field (KEYTYPEB field) of each set 130, 140, 150 of instructions based upon the value of the first keytype field (KEYTYPEA field) of each respective set of instructions. For example, for each set 130, 140, 150 of instructions, the value of the second keytype field (KEYTYPEB field) may be set equal to the value of the first keytype field (KEYTYPEA field) of the set of instructions.

As the network processor 104 obtains newly available routes, and as old routes become invalid, the network processor 104 may write a second routing table (e.g., second table 180 or TABLE2 in FIG. 1) into the second memory 160 that reflects the changes in the routes (or other changes to the network to which the network processor 104 is connected) (step 312). The second routing table may be, for example, an updated version of a first table previously written into the memory 160.

In step 314, the network processor 104 assigns a unique value to the tabletype field of the newly written table. For example, if the value of the tabletype field 172 of the first table 170 is 0000, the value of the tabletype field 182 of the second table 180 may be 0001. Other numbering schemes also may be employed.

In step 316, for each set of instructions used to create a key that will access the second, newly written table, the second keytype field (KEYTYPEB field) of the set of instructions is assigned a value based on the tabletype field of the second table (e.g., the KEYTYPEB field of the set of instructions is assigned a value that equals that of the tabletype field 182 of the second table 180). For example, in the system shown in FIG. 1, if the first set 130 of instructions for creating a key (KEY1) and the second set 140 of instructions for creating a key (KEY2) will be used to create keys that will access the second table 180 (TABLE2), the values for the KEYTYPEB fields of the sets 130, 140 of instructions for creating a key are assigned the value of the tabletype field 182 of the second table 180.

In step 318, a value of at least one bit in the atomic switch register 112 is modified to instruct each set 130, 140, 150 of instructions for creating a key to employ its second keytype field (KEYTYPEB field) when creating keys.

After step 318, keys created by either instruction set 130 or instruction set 140 will access the new table (e.g., each key will have a keytype field value that matches the tabletype field 182 of the second table 180). However, keytype fields of keys created by a set of instructions for creating keys that do not need to access the new table (e.g., the keytype field of instruction set 150) remain unchanged because the second keytype field (KEYTYPEB field) of each such instruction set has the same value as the first keytype field (KEYTYPEA field) of the instruction set. In step 320, the method of FIG. 3 ends.

Through use of the method of FIG. 3 and the atomic switch register 112, all sets of instructions that are used to generate keys that access a new table may be updated at the same time (e.g., in an "atomic" manner). Accordingly, all newly generated keys may be directed to their proper (e.g., up-to-date) table.

The method described above may further include a step following step 318 in which the network processor 104 changes the value of the first keytype field (KEYTYPEA field) of each set of instructions for creating a key to the value of the second keytype field (KEYTYPEB field) of each set of instructions for creating a key; and optionally, the atomic switch register 112 may be returned to its "pre-switch" bit value state. In this manner, steps 312-318 may be repeated for each new table written into the second memory 160 (e.g., to ensure that keys access up-to-date tables).

The foregoing description discloses only the exemplary embodiments of the invention. Modifications of the above-disclosed apparatus and method which fall within the scope of the invention will be readily apparent to those of ordinary skill in the art. For instance, while the present method and apparatus disclose the use of two keytype fields for each set of instructions for creating a key, a greater number of keytype fields may also be used.

Further, the network processor 104 may create keys directly based on incoming data packets, rather than employing instructions sets stored within the first memory 120 for key creation. That is, the network processor 104 may create keys for data packets received by the network processor 104 and store the keys within the first memory 120. For example, based on packet classification information, the network processor 104 may create keys for each received packet that may include a plurality of bytes of header information from the packet, a plurality of bits of information stored in a first keytype field and a plurality of bits of information stored in a second keytype field.

In at least one such embodiment of the invention, each key stored within the first memory 120 will have both a first keytype field (KEYTYPEA field) and a second keytype field (KEYTYPEB field) rather than a single keytype field. The atomic switch register 112 then may be coupled to each key and employed to globally select either the value of the first keytype field or the second keytype field to be used as part of the key to access a table. A process similar to that described above with reference to FIG. 3 may be employed to ensure that each key accesses the most up-to-date version of a table. In general, the process of FIG. 3 may be used with any suitable pointer (e.g., a set of instructions that is used to create a key, a key, etc.).

Note that one or more of the steps of the process of FIG. 3 may be embodied in one or more computer program products (whether the process operates on sets of instructions for creating keys or keys stored within the first memory 120). A single memory or more than two memories may be used in place of the memories 120, 160.

Accordingly, while the present invention has been disclosed in connection with exemplary embodiments thereof, it should be understood that other embodiments may fall within the spirit and scope of the invention as defined by the following claims.

The invention claimed is:

1. A method comprising:
providing a pointer that includes a first keytype field and a second keytype field;
assigning a value to the second keytype field of the pointer based on a tabletype field of an updated table, the updated table being an updated version of a first table written in a memory, the first keytype field of the pointer having a value assigned based on a tabletype field of the first table; and
employing the second keytype field of the pointer to point to the updated table.

2. The method of claim 1 wherein providing a pointer comprises providing a set of instructions for creating a key that points to a table based on the first keytype field or the second keytype field.

3. The method of claim 2 wherein the set of instructions is adapted to create the key based on a plurality of bytes of incoming data and the first keytype field or the second keytype field.

4. The method of claim 1 wherein providing a pointer comprises providing a key that includes the first keytype field and the second keytype field and that points to a table.

5. The method of claim 4 wherein the key includes a plurality of bytes based on incoming data, a plurality of bits for the first keytype field and a plurality of bits for the second keytype field.

6. The method of claim 1 wherein an initial value of the second keytype field is set to the value of the first keytype field.

7. The method of claim 1 wherein assigning a value to the second keytype field of the pointer based on a tabletype field of an updated table comprises equating the value of the second keytype field to the tabletype field.

8. The method of claim 1 wherein assigning a value to the second keytype field of the pointer comprises determining the value of the second keytype field and writing the value of the second keytype field in a memory.

9. The method of claim 1 wherein employing the second keytype field of the pointer to point to the updated table comprises writing one or more bits to a register and based upon the writing, employing the second keytype field to point to the updated table.

10. The method of claim 9 wherein writing to a register comprises writing to a register of a controller of a network processor.

11. The method of claim 1 wherein providing a pointer that includes a first keytype field and a second keytype field comprises providing a plurality of pointers each having first and second keytype fields;
   wherein assigning a value to the second keytype field of the pointer based on a tabletype field of an updated table, comprises assigning a value to the second keytype field of one or more of the plurality of pointers based on a tabletype field of an updated table; and
   wherein employing the second keytype field of the pointer to point to the updated table comprises employing the second keytype field of the one or more of the plurality of pointers to point to the updated table.

12. The method of claim 1 further comprising setting the value of the first keytype field equal to the value of the second keytype field.

13. The method of claim 12 further comprising employing the first keytype field of the pointer to point to the updated table.

14. The method of claim 13 wherein employing the first keytype field of the pointer to point to the updated table comprises writing one or more bits to a register and based upon the writing, employing a first keytype field to point to the updated table.

15. The method of claim 13 wherein employing the second keytype field of the pointer to point to the updated table comprises:
   examining a value of a register of a network processor; and
   based on the value of the register, employing the second keytype field to generate a key that points to the table.

16. The method of claim 13 wherein employing the second keytype field of the pointer to point to the updated table comprises:
   examining a value of a register of a network processor; and
   based on the value of the register, employing the second keytype field of a key to point to the table.

17. A method comprising:
   writing a table in a memory;
   assigning a unique tabletype field to the table;
   providing a pointer that includes a first keytype field and a second keytype field;
   assigning a value to the first keytype field based on the tabletype field of the table;
   writing an updated version of the table in the memory;
   assigning a unique tabletype field to the updated version of the table;
   assigning a value to the second keytype field of the pointer based on the tabletype field of the updated version of the table; and
   employing the second keytype field of the pointer to point to the updated table.

18. The method of claim 17 wherein providing a pointer comprises providing a set of instructions for creating a key that points to a table based on the first keytype field or the second keytype field.

19. The method of claim 17 wherein providing a pointer comprises providing a key that includes the first keytype field and the second keytype field and that points to a table.

20. The method of claim 17 wherein the updated version of the table includes newly evolved routing data.

21. The method of claim 20 wherein the updated table includes TCP/IP routing data.

22. The method of claim 17 wherein employing the second keytype field of the pointer to point to the updated table comprises writing one or more bits to a register and based upon the writing, employing the second keytype field to point to the updated table.

23. The method of claim 17 wherein employing the second keytype field of the pointer to point to the updated table includes directing all pointers to employ a second keytype field for pointing.

24. The method of claim 17 wherein employing the second keytype field of the pointer to point to the updated table comprises:
   examining a value of a register of a network processor; and
   based on the value of the register, employing the second keytype field to generate a key that points to the table.

25. A method comprising:
   providing a plurality of pointers, each pointer including a first keytype field and a second keytype field;
   for each pointer, setting a value of the second keytype field equal to a value of the first keytype field;
   directing each pointer to employ the first keytype field of the pointer during pointing;
   writing an updated version of a table in a memory;
   assigning a unique tabletype field to the updated version of the table;
   assigning a value to the second keytype field of one or more of the pointers based on the tabletype field of the updated version of the table; and
   directing each pointer to employ the second keytype field of the pointer during pointing.

26. The method of claim 25 wherein directing each pointer to employ the first keytype field of the pointer during pointing comprises writing a first value into a register.

27. The method of claim 26 wherein directing each pointer to employ the second keytype field of the pointer during pointing comprises writing a second value into the register.

* * * * *